May 29, 1951 R. CHAPLIK 2,554,775
SANITARY FAUCET
Filed May 14, 1949 2 Sheets-Sheet 1
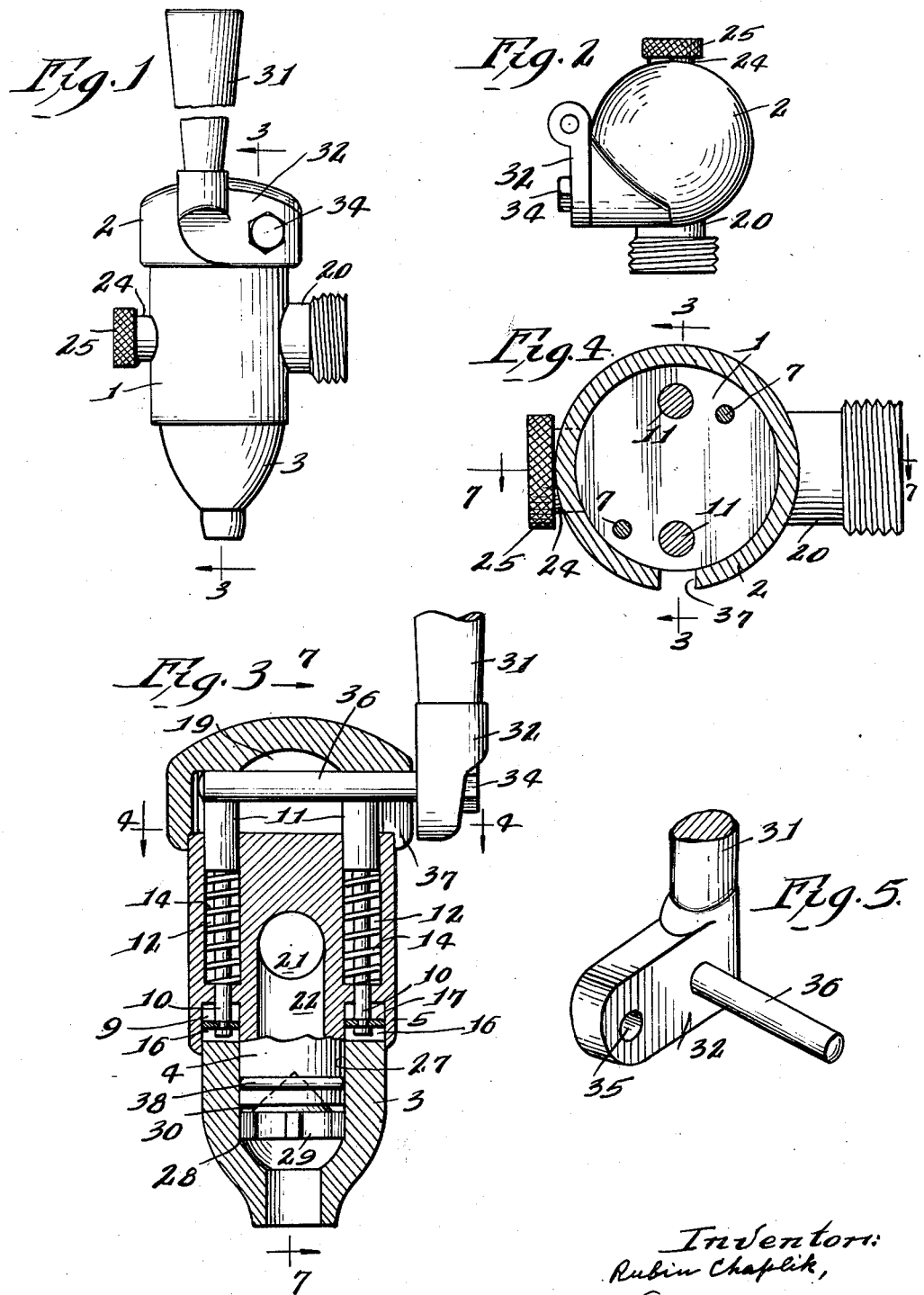
Inventor:
Rubin Chaplik,
By Wm. F. Freudenreich,
Attorney.

May 29, 1951  R. CHAPLIK  2,554,775
SANITARY FAUCET
Filed May 14, 1949  2 Sheets-Sheet 2
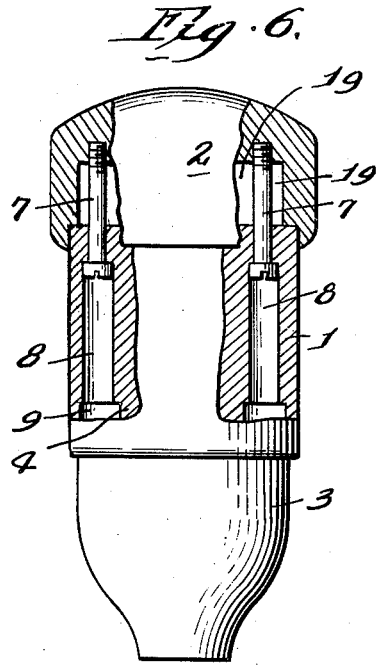
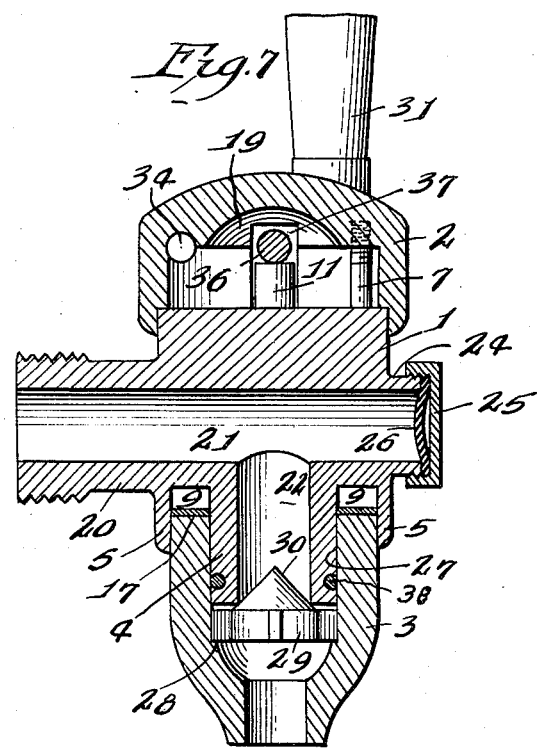
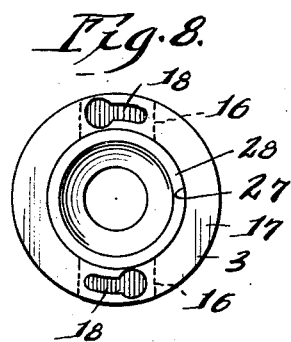
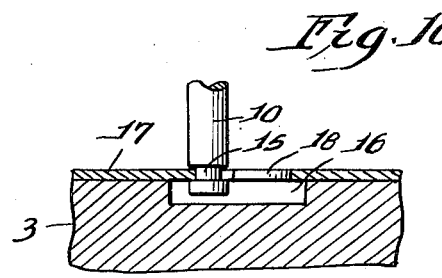
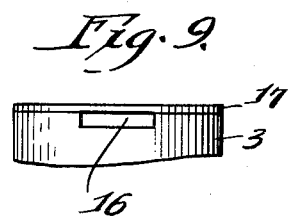
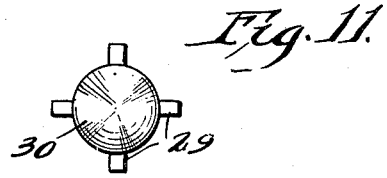
Inventor:
Rubin Chaplik,
By Wm F. Freudenreich,
Attorney.

Patented May 29, 1951

2,554,775

UNITED STATES PATENT OFFICE 2,554,775

SANITARY FAUCET

Rubin Chaplik, Chicago, Ill.

Application May 14, 1949, Serial No. 93,337

4 Claims. (Cl. 251—115)

The present invention relates to that type of faucet wherein the actuating means for the valve are outside of the passage or space through which the liquid flows, and has for its object to produce a greatly improved faucet.

Viewed in one of its aspects, the present invention may be said to have for one of its objects to produce a faucet wherein the only parts that need be contacted by liquid, during the dispensing of the same are the passage-defining surfaces and a simple elementary valve member.

Viewed in another aspect, the present invention may be said to have for an object to produce a faucet that may be cleaned quickly, easily and effectively.

Viewed in another aspect, the present invention may be said to have for an object to produce a faucet that is opened and closed by moving a spout, the latter being quickly detachable without using tools; and which carries the movable member of the valve resting loosely in the same.

The various features of novelty whereby the present invention is characterized will hereinafter be pointed out with particularity in the claims, but, for a full understanding of the invention and of its objects and advantages, reference may be had to the following detailed description taken in connection with the accompanying drawings, wherein:

Figure 1 is a side view of a faucet that embodies the present invention in a preferred form; Fig. 2 is a top plan view of the faucet; Fig. 3 is a section on line 3—3 of Fig. 1 or Fig. 4; Fig. 4 is a section on line 4—4 of Fig. 3; Fig. 5 is a perspective view of the base end of the faucet handle; Fig. 6 is a section on line 6—6 of Fig. 4; Fig. 7 is a section on line 7—7 of Fig. 3; Fig. 8 is a plan view of the spout detached from the faucet; Fig. 9 is a side view of the spout, only the upper or inner end being shown; Fig. 10 is a section, on a larger scale than Figs. 8 and 9, on line 10—10 of Fig. 8; and Fig. 11 is a top view of the movable element of the valve in the faucet.

The casing or housing of the faucet is formed of three axially aligned sections, a central, cylindrical body member 1, a round cap 2, and a round tubular spout 3. The body member has an axial downward extension 4 of smaller diameter and has a depending, annular skirt or flange 5 surrounding and spaced apart from extension 4. The cap and head sections are secured together, as best shown in Fig. 6, by two screws 7, 7, that extend up from within passages 8, 8 in and extending lengthwise through the body member parallel to the axis of the device, into the cap; these passages opening out through the lower end of the body member into the annular space 9 between elements 4 and 5 of the body member.

The spout member 3 is suspended from the lower ends of a pair of actuators yieldingly supported in member 1, as best shown in Fig. 3. Each of these actuators consists of a long rod 10 having at its upper end a part 11 of enlarged diameter. The actuators are arranged in deep wells 12 extending down from the upper end of the body member almost to the bottom, with the lower ends of the rods 10 extending down through the bottom wall of the well into the annular passage 9. In each well is a long compression spring 14 resting on the bottom of the well and engaged at its upper ends with the under side of the enlargement 11 on the upper end of the rod. As best shown in Figs. 8, 9 and 10, each actuator is provided with an annular peripheral groove 15 close to the lower end, while the spout member contains in its upper edge two notches 16 covered by a plate element 17 that contains a key hole slot 18 directly over each notch. The plate element has a thickness slightly less than the width of the grooves 15 so that when the actuator rods are inserted through the large ends of the key hole slots and moved along the slots, the marginal edges of the plate element along the slots enter the grooves 15 and effect an interlock between the actuators and the spout. The grooved ends of the rods may therefore be regarded as being headed pins projecting from members that rest on top of the slotted plate. The parts are so proportioned that, when free to do so, the actuators hold the spout with its upper end extending well up into the annular recess 9, while the upper ends of the actuators project well above the top of the body member; the cap therefore being a hollow dome that contains a large chamber 19 to provide room for the upper ends of the actuators and an operating device for the same.

The body member 1 is provided at one side with a radial projection 20 for attaching the faucet to a source of liquid supply. The passage for the liquid to be dispensed comprises a bore 21 extending through projection 20 and diametrically through the body member, together with a communicating bore 22 located axially of extension 4 on the body member. The dead end of bore 21 opens out through a boss 24 on the body member and is closed by a cap 25 screwed onto the boss; a sealing disc 26 being interposed between the end of the boss and the cap. It should be noted that the screw threads on the cap and boss do not come into contact with liquid passing through the faucet. The extension 4 is a sliding fit in the spout, the bore 27 in the latter being abruptly reduced in diameter to provide an upwardly facing annular shoulder 28. Resting loosely on this shoulder is a valve that comprises a spider or open work base 29 surmounted by a conical valve 30, the large diameter of which is preferably a little greater than the diameter of bore 22; so that when the spout is drawn up by the springs, the cone fits tightly into and seals the outlet end of bore 22.

To turn on the flow of liquid the actuators must be pressed down. To accomplish this I provide a handle that is L-shaped, comprising a long arm 31 and a short arm 32. The handle is mounted on the faucet by inserting a headed stub shaft 34 in a hole 35 in arm 32, near the free end of the latter, and attaching the shaft to the cap with its axis parallel to a plane containing the axes of the two actuating rods. Projecting laterally from the short arm of the handle, near the juncture of the two arms, is a long, sturdy finger 36 paralleling the pivotal axis of the handle. The parts are so constructed that, as shown in Figs. 2 and 7, finger 36 extends into the chamber in the cap 2 through a notch or slot 37 in the latter, spanning the distance between and overlying and in contact with both of the actuators.

Although faucets of the type under consideration are used under conditions that place little pressure on the liquid that is being dispensed, I prefer to provide extension 4 with a suitable circumferential packing ring 38 to form a good seal between the extension and the surrounding spout.

After the parts of the faucet are assembled, the springs normally hold the valve closed and the long arm of the handle in an upright position, as shown in the drawings. To turn on the faucet, the handle is simply swung through a small angle in the counter clockwise direction as viewed in Fig. 1, or in the clockwise direction in Fig. 7, to push the spout down. Liquid is thus permitted to flow down past the conical part of the valve and through its openwork base to be discharged in a smoothly flowing stream without sputtering or spraying. Upon release of the handle, the spout is automatically drawn up and shuts off all liquid flow. The spout can never move down far enough to carry its upper end past the packing ring and, in actual practice, the downward movement is preferably not sufficient to clear the lower edge of skirt 5.

When the faucet is to be cleaned, cap 25 may be unscrewed and the spout be turned to bring the actuators into the large ends of the key hole slots, whereupon the spout may be drawn out lengthwise, bringing the loose valve member with it. With cap 25 and the spout removed, the bores 21 and 22 easily can be cleaned thoroughly, as can the cap, the spout and the loose valve. Again to attach the spout, the valve is simply dropped in and the spout is then slipped on extension 4 and turned to restore the interlock with the actuating rods.

It will be seen that there are no obstructions, whatever, in bores 21 and 22, that the loose valve is kept clean by liquid flowing over the same and that the only shoulder or ledge, anywhere, on which unwanted material might collect, is shoulder 28 in the spout; and this little shoulder is easily cleaned. Therefore, the faucet cannot easily become unclean and, since cleaning is very easily done, the faucet can without difficulty be maintained in a thoroughly sanitary condition.

While I have illustrated and described with particularity only a single preferred form of my invention, I do not desire to be limited to the exact details thus illustrated and described, but intend to cover all forms and arrangements that come within the definitions of my invention constituting the appended claims.

I claim:

1. In a faucet, a body member provided with a depending outlet element forming the lowermost part of the body member and having therein an unobstructed passage for liquid terminating in an outlet at the lower end of said element, an annular packing on the exterior of said outlet element and engaged with the interior of the spout, a spout surrounding and slidable up and down on said element and projecting below the latter, a skirt depending from the body member and fitting slidably around the upper end of the spout, a valve set loosely in the spout to close the outlet, means external to said passage to move the spout up and down, and quickly detachable connections, including key hole slots and grooved rod elements cooperating therewith, between said means and said spout.

2. In a faucet, a body member having an axial, depending, tubular outlet element and having also a bore extending transversely entirely through the same and communicating with the interior of said tubular element, one end of said bore being a liquid inlet, a detachable closure for the other end of the bore, a spout surrounding and slidable up and down on the outlet element, actuators for the spout mounted in the body member above the spout and outwardly from said outlet element, for vertically sliding movements, to move the spout member up and down, a handle device movably mounted on said detachable closure and having parts engaged with the upper ends of the actuators to press the actuators down, each actuator having at its lower end a cylindrical section containing a circumferential groove, the spout having in its upper edge key hole slots to receive the said lower ends of the actuators, the large ends of the slots allowing the said lower ends of the actuators to pass through while the narrow portions of the slots are only wide enough to admit the actuators at their grooves, and a valve in the spout to engage with the lower end of said outlet element when the spout is up.

3. In a faucet, a body member having an axial, depending, tubular outlet element and containing a bore connected with the interior of the said tubular element to deliver liquids thereto, a spout surrounding and slidable lengthwise of said element, a hollow cap on the upper end of the body member, actuators for the spout extending lengthwise through and slidable vertically in the body member clear of said bore and said outlet element, with their upper ends extending into the cap, connections between the lower ends of the actuators and the top of said spout to hold the spout and the actuators against relative vertical movements, a valve in the spout in position to close the lower end of the said outlet element when the spout is drawn up, spring means acting on the actuators to cause them to draw the spout up, a handle pivoted to the cap, a rigid finger extending laterally from the handle across the interior of the cap and over the tops of the actuators to press the same and the spout down when the handle is swung in one direction.

4. In a faucet, a body member having a depending tubular outlet element and a shorter annular skirt extending down around and in spaced relation to the outlet element, a spout telescoped on said outlet element and extending up into the space between the latter and the skirt, a valve in said spout cooperating with the lower end of the outlet element to form a closure for the latter, actuators for the spout slidable up and down in the body member in positions that bring the lower ends thereof on the outer side of the outlet element and on the inner side of the skirt, quickly detachable connections between the lower ends of the actuators and the upper end of the spout to hold them against relative vertical movements, springs tending constantly to move the actuators upwardly, a movable handle supported by the body member and having a part engaged with the upper ends of the actuators to press the actuators down when the handle is moved in one direction, and a packing between the outlet element and the spout at a level lower than that reached by the spout when at the lower limit of its movement.

RUBIN CHAPLIK.

REFERENCES CITED

The following references are of record in the file of this patent:

UNITED STATES PATENTS

| Number | Name | Date |
|---|---|---|
| 320,705 | Schofield | June 23, 1885 |
| 498,366 | Savill | May 30, 1893 |
| 1,627,020 | Dougherty | May 3, 1927 |
| 1,638,032 | Himmelsbach | Aug. 9, 1927 |
| 1,639,450 | Bastian | Aug. 16, 1927 |
| 1,768,709 | Paradis | July 1, 1930 |
| 1,813,581 | Rodrigues | July 7, 1931 |
| 1,852,233 | Dailey | Aug. 5, 1932 |